United States Patent [19]

van der Lely

[11] 3,995,416
[45] Dec. 7, 1976

[54] HAY MAKING MACHINES

[76] Inventor: Cornelis van der Lely, 7, Bruschenrain, Zug, Switzerland

[22] Filed: May 14, 1974

[21] Appl. No.: 469,764

[30] Foreign Application Priority Data

May 15, 1973 Netherlands ...................... 7306706

[52] U.S. Cl. .................................. 56/370; 56/377
[51] Int. Cl.² ......................................... A01D 79/00
[58] Field of Search ............ 56/370, 375, 365, 377

[56] References Cited

UNITED STATES PATENTS

| | | | |
|---|---|---|---|
| 2,669,826 | 2/1954 | Watrous | 56/17.1 |
| 3,559,389 | 2/1971 | van der Lely | 56/370 |
| 3,664,105 | 5/1972 | Stiefvater | 56/370 |
| 3,664,106 | 5/1972 | Maugg | 56/370 |
| 3,707,122 | 12/1972 | Cargill | 101/93.34 X |
| 3,827,224 | 8/1974 | Mulder et al. | 56/370 |
| 3,952,489 | 4/1976 | van der Lely | 56/370 |

FOREIGN PATENTS OR APPLICATIONS

| | | | |
|---|---|---|---|
| 2,160,771 | 6/1972 | Germany | 56/370 X |
| 1,295,265 | 5/1969 | Germany | 56/370 X |
| 435,836 | 1967 | Switzerland | 56/370 X |

Primary Examiner—Hugh R. Chamblee
Assistant Examiner—Peter K. Skiff
Attorney, Agent, or Firm—Mason, Mason & Albright

[57] ABSTRACT

A hay-making machine has at least one rake member rotatable about an upwardly directed axis of rotation and comprising tines, which are outwardly pivotable by centrifugal forces exerted during rotation of the rake member.

The tines convert from a working position and a transport position or conversely solely by centrifugal force and their own weight without the need for using spring means. According to the invention the tines are pivotable into a transport position only by means of their dead weight.

37 Claims, 22 Drawing Figures

HAY MAKING MACHINES

For a better understanding of the invention and to show how the same may be carried into effect, reference is made by way of example to the accompanying drawing.

Figure 1:
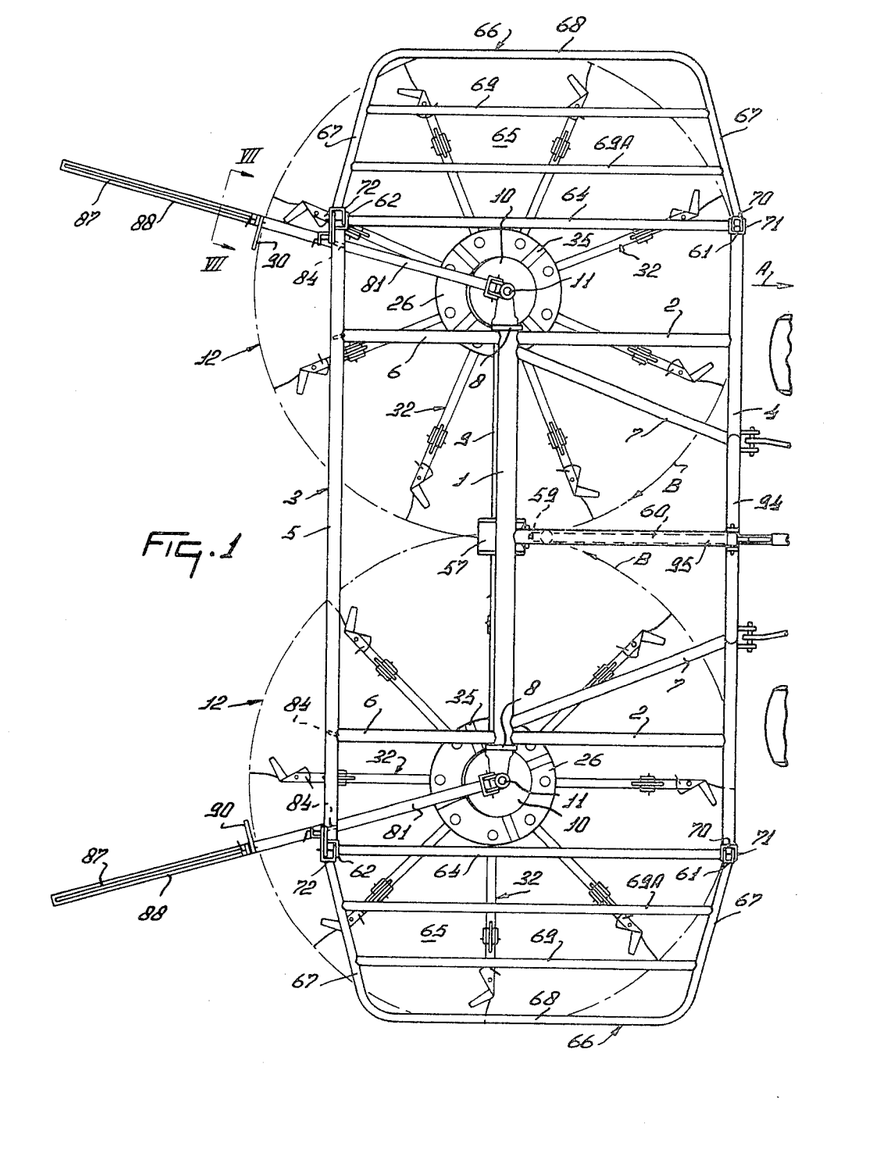
FIG. 1 is a plan view of a hay-making machine embodying the invention.
Figure 2:
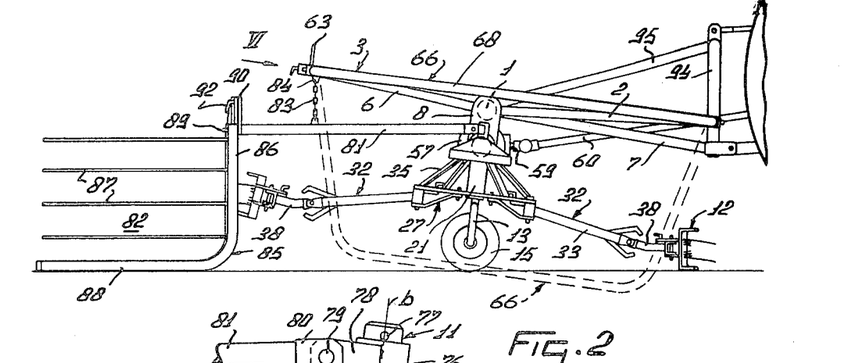
FIG. 2 is a side elevation of the device shown in FIG. 1.
Figure 3:
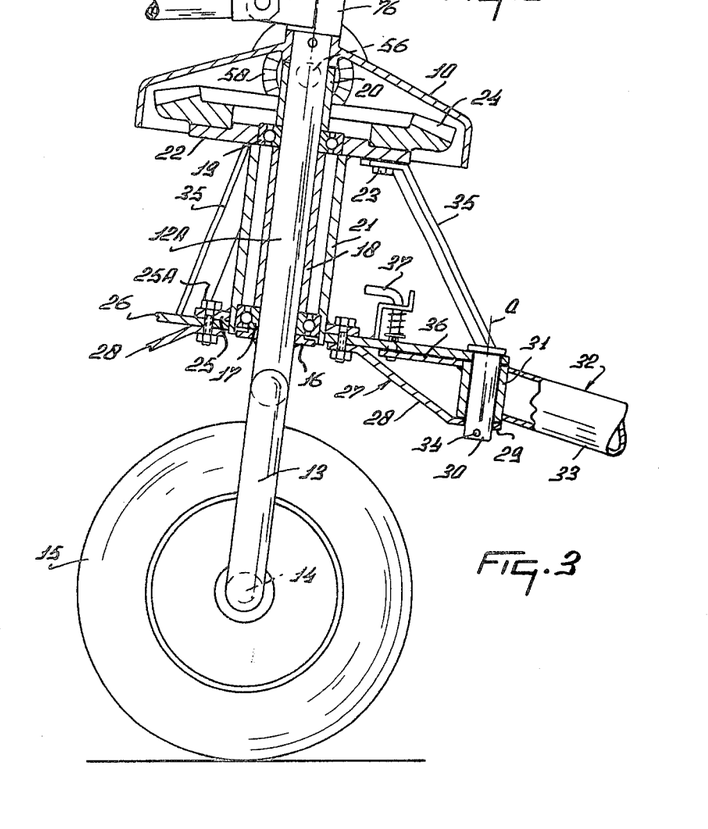
FIG. 3 is an enlarged part of a sectional view taken on the line III—III in FIG. 1.

The construction shown in FIGS. 1 to 8 is that of a hay-making machine comprising a frame having a substantially horizontal frame beam 1, extending transversely of the direction of movement A of the device. The frame beam 1 is tubular and preferably has a circular cross section. The ends of the frame beam 1 are secured by connecting beams 2 extending in the direction of movement A to a foremost frame beam 4 associated with a protective part 3. The frame beam 1 is connected with a frame beam 5 associated with the protective part 3 by means of connecting beams 6, which are in line with the connecting beams 2, viewed on plan (see FIG. 1). The beams 4 and 5 of the protective part 3 are located somewhat above the frame beam 1. Near the ends of the frame beam 1 within the connecting beams 2, struts 7 are arranged on the frame beam so that viewed in plan, they are converging and are secured to the foremost connecting beam 4. To the ends of the frame beam 1 are secured vertical plates 8, extending in downward direction. Between the lower ends of the plates 8, a tubular frame beam 9 extends parallel to the frame beam 1. The ends of the frame beam 1 are provided with gear boxes 10 in each of which downwardly extending shafts 11 are fastened. Each shaft 11 extends from its fastening point in the gear box 10 over a straight portion 12A and terminates in a bracket-shaped portion 13, the limbs of which are substantially horizontal (FIG. 3), the lower limb 14 forming a rotary shaft for a rotatable supporting member formed by a ground wheel $x$ 15. A rake member 12 is rotatably arranged on each shaft 11. For this purpose a support 16 holding a bearing 17 is fastened at a given distance above the bracket-shaped portion 13 to the straight portion 12A of the shaft 11. The portion 12A is furthermore surrounded by a sleeve 18 bearing on the bearing 17, the top side of said sleeve holding a second bearing 19. The portion 12A is surrounded between the bearing 19 and the gear box 10 by a sleeve 20. By means of the bearings 17 and 19 a sleeve 21 is rotatably arranged and provided on the top side with a ring 22 extending substantially at right angles to the longitudinal center line of the portion 12A, said ring having fastened to it by bolts 23 a toothed rim 24. Near the lower side the sleeve is provided with a ring 25 joining the circumference of the sleeve and having secured to it by means of bolts 25A a supporting ring 26. (FIG. 3). The sleeve 21 and the supporting ring 26 constitute a central part of a rake member 12. By means of the bolts 25A, eight tags 27 are secured to the lower side of the supporting ring 26 at equal distances from one another. The tags 27 comprise a straight portion 28 inclined downwardly away from the fastening area of the bolts 23 and terminating in a portion 29 parallel to the supporting ring 26. Between the supporting ring 26 and the portion 29 of a tag 27 a sleeve 31 is arranged by means of a pin 39 so as to be freely rotatable. The longitudinal center line $a$ of the pin 30 is parallel to the portion 12A, the longitudinal center line of which $b$ constitutes the rotary axis of the rake member. The sleeve 31 is fastened to a tubular arm 32. The pin 30 is held by a head on the supporting ring 26 and is secured in place on the lower side by means of a safety pin 34. Between the supporting ring 26 and the ring 22, supports 35 are arranged at equal distances from one another. The supports 35 extend away from the ring 22 in a downwardly inclined direction. The sleeve 31 is provided with an inwardly projecting extension 36, which is adapted to bear on a pin forming a stop 37 passed through a hole in the supporting ring 26 and adapted to be displaced against spring force in its direction of length so that the lower end of the pin can be moved out of the reach of the extension 36, in which position the pin can be secured against rotation.

Figure 4:
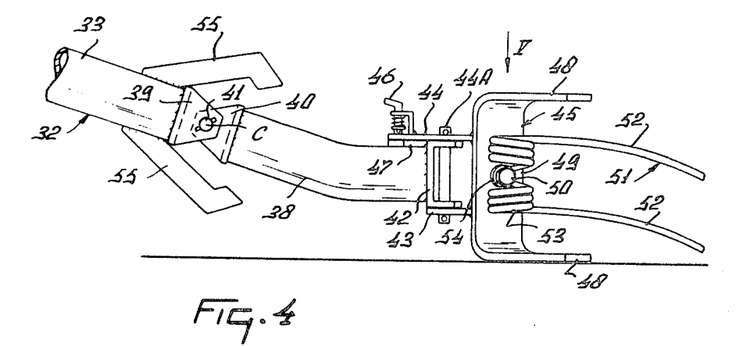
FIG. 4 shows on an enlarged scale the connection of a support for the tines with the arm of the rake member.

As will be apparent from FIGS. 2 and 4, the arm 32 has two portions 33 and 38, provided at their proximal ends with a fork 39 and 40 respectively, the prongs of which extend upwardly. The prongs of the fork 40 are pivotally arranged by means of a pin 41 between the prongs of the fork 39. The longitudinal center line $c$ of the pin 41, which affords the pivotal joint between the two portions 33 and 38, crosses the longitudinal center line $d$ of the pin 30 at least substantially at right angles. The portion 33 of the arm 32 arranged on the supporting ring 26 is straight and the portion 38 is kinked near the center so that the longitudinal lines of the resultant two portions are at an obtuse angle to each other on the top side. At the end remote from the fork 40 the portion 38 has a fork 42, the prongs of which are located one above the other. On the distal sides of the prongs tags 43 and 44 bear on said prongs and are arranged on a support 45. The tags 43 and 44 are pivotable with respect to the fork 42 by means of a pin 44A. The longitudinal center line $d$ of the pin 44A extends upwardly. The topmost tag 44 is longer than the lower tag 43 and is provided with a pin 46, which is displaceable in its direction of length against spring force. The pin 46 can be inserted into one of two holes 46A provided in a sector-shaped plate 47 located beneath the tag 44 and on the top side of the portion 38. The support 45 is made from sheet material and shaped in the form of a bracket, the limbs of the bracket being located one above the other.

Figure 5:
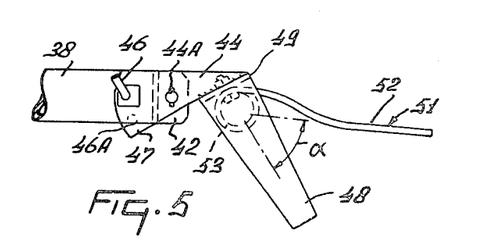
FIG. 5 is an elevation in the direction of the arrow V in FIG. 4.

It will be seen from FIG. 5 that the support 45 is connected with the tags 43 and 44 so that the limbs 48 of the bracket extend rearwardly with respect to the direction of rotation B of a rake member 12. Between the limbs 48 the web of the bracket is provided on the side remote from the tags 43 and 44 by means of a bolt 50 with a pair of tines 51, which are formed by a single length of resilient material. The tines 51 comprise an active portion 52, which terminates through three coils 53 in a portion 54 located between the coils and secured in place by means of the bolt 50. The axis of the coils 53 is at least substantially parallel to the pin 44A. It will be apparent from FIG. 4 that the active portions 52 of the tines are regularly curved throughout their length so that the tines extend downwards to their free ends.

FIG. 5 shows that the active portions 52 of the tines 51 are curved over a part away from the coils 53, after which they terminate in a straight portion, which is at least substantially radial to the rotary shaft of the rake member 12 in the position shown in FIG. 5. FIG. 5 shows furthermore that the active portion 52 of the tines 51 is located outside the limbs 48 of the support 45 and the longitudinal center line of the straight portion is at an angle $\alpha$ to the longitudinal center line of the limbs 48, $\alpha$ being larger than 30° and preferably 45°, so that the tines can satisfactorily attack the crop. At the end of the portion 33 of the arm 32, holding the fork 39, stops 55 are provided on the top and bottom sides, said stops being inclined away from their fastening point on the portion and then bent over towards one another to form supporting surfaces at their ends for holding the portion 38 of the arm 32 subsequent to its turn about the pin 41. For driving each of the rake members 12 the lower, tubular beam 9 accommodates a shaft 56, which is journaled near the center of the support in a gear box 57 and is held near the ends of the beam 9 by bearings (not shown). Each of the ends of the shaft 56 projecting into the gear boxes 10 is provided with a bevel gear wheel 58, which is adapted to cooperate with the toothed rim 24 in the gear box. Inside the gear box 57 located near the center of the beam 9 the shaft 56 is in driving connection by means of a bevel gear wheel transmission with a shaft 59, extending in the direction of movement A and projecting from the front side of the gear box and adapted to be coupled with the power take-off shaft of a tractor with the aid of an auxiliary shaft 60.

Figure 6:
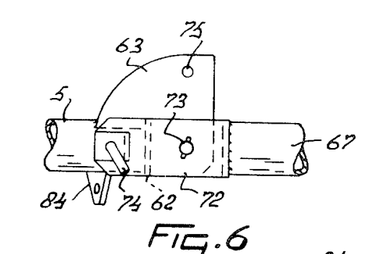
FIG. 6 is an enlarged elevation in the direction of the arrow VI in FIG. 2.
Figure 7:
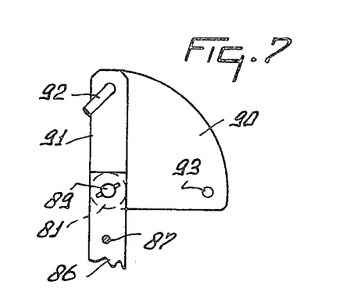
FIG. 7 is an enlarged elevation taken on the line VII—VII in FIG. 1.
Figure 8:
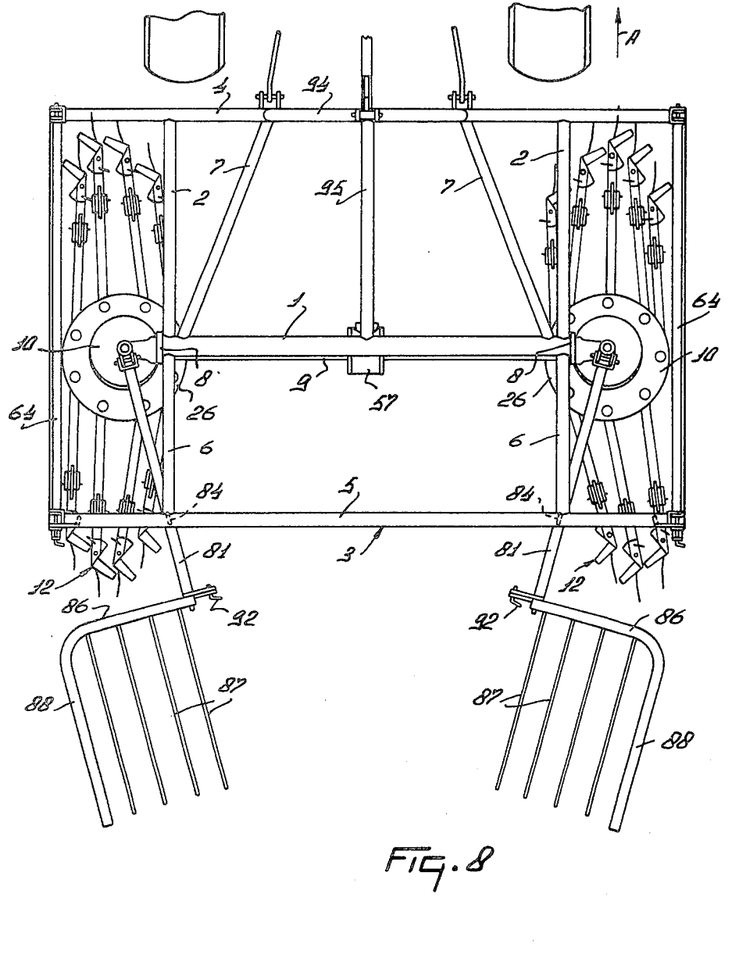
FIG. 8 is a plan view of a hay-making machine embodying the invention in the transport position.

The ends of the foremost frame beam 4 of the protective part 3 are provided each with a fork 61, the prongs of which extend upwardly. The ends of the hindmost beam 5 of the protective part 3 are each provided with a fork 62, the prong located on the rear side thereof being provided with a sector-shaped plate 63 (FIG. 6). Between the prongs of the forks 61 and 62 connecting beams 64 extend in the direction of movement. With the protective part 3 are furthermore associated two parts 65 having each a bracket 66. The limbs 67 of the bracket 66 are diverging, whereas the connecting part 68 extends at least substantially in the direction of movement. Between the limbs 67 connecting beams 69 and 69A extend parallel to the connecting part 68. The ends of the foremost limbs 67 of the brackets 66, viewed in the direction of movement A, are each provided with a fork 70, the prongs of which are pivotally arranged by means of a pin 71 between the prongs of the forks 61 at the ends of the foremost frame beam 4. The hindmost limbs 62 are provided with forks 72, the prongs of which are pivotally arranged by means of a pin 73 to the prongs of the forks 62 of the hindmost frame beam 5. The longitudinal center lines of the pins 71 and 72 are in line with each other and extend in the direction of movement and they constitute a pivotal axis for the parts 65. The hindmost prong of the fork 72 bears on the plate 63 and is provided with a spring-controlled pin 74, which is displaceable in its direction of length and can be inserted into a hole in the limb and into one of two holes 75 in the plate 63 (FIG. 6). With the aid of the pin 74 and the holes 75 the part 65 can be tilted down into the position indicated by broken lines in FIG. 2. The shafts 11 project on the top side over a given distance from the gear boxes 10 and are surrounded at this place by a sleeve 76, which is held in place by means of a safety pin 77. The sleeve 76 is provided on the rear side, viewed in the direction of movement A, with tags 78 (FIG. 3). To the tags 78 are pivoted the prongs of a fork 80 by means of a pin 79, which extends at least substantially in a horizontal direction and which crosses the rotary axis of a rake member 12 at least substantially at right angles. The fork 80 is secured to an arm 81, which extends rearwardly and which is provided with a guide member 82. The arm 81 can be fastened at two places by means of a flexible connecting member 83 and ears 84 to the hindmost frame beam 5 so that it can be moved into two positions by turning about an axis coinciding with the rotary axis of a rake member. The guide member 82 comprises a support 85. The support 85 has an upright portion 86 in operation, to which a plurality of parallel resilient bars 87 are secured. The part 86 terminates in a part 88 at right angles to the former, which can stand on the ground in operation, which part is at least substantially parallel to the bars 87. The length of the part 88 is at least substantially equal to the length of the bars 87. The support 85 is adapted to pivot about a pin 89, which extends in the direction of length of the arm 81. The arm 81 is provided with an upright, sector-shaped plate 90, which is at least substantially normal to the pin 89. The support 85 is provided with a strip 91 having a hole for passing a pin 92. The pin 92 may also be passed through one of two holes 93 in the plate 90 so that a guide member can be moved by turning about the pin 89 from the working position into the transport position shown in FIG. 8. In this position the guide member 82 extends at least substantially in a horizontal direction.

At the front, near the center of the foremost frame beam 4 a trestle 94 is provided for the attachment to the three-point lifting device of a tractor. The top side of the trestle 94 is secured on the rear side by means of a supporting beam 95 to the frame beam 1.

In operation the implement is connected by means of the trestle 94 with the three-point lifting device of the tractor and the shaft 59 projecting from the front side of the gear box 57 is linked by means of the auxiliary shaft 60 to the lower take-off shaft of the tractor so that from the power take-off shaft and via the transmission described above the rake members 12 can be rotated about the upright portions 12A of the shafts 11 in the direction indicated by the arrow B in FIG. 1. When the rake members 12 are set rotating, the arms 32 provided at the ends with the bracket-shaped support 45 for the tines 51, swing about the upright longitudinal center line $a$ of the pin 30 into an at least substantially radial position shown in FIG. 1 under the action of centrifugal force. In this position the arms 32 are capable of pivoting freely in at least one direction about the pin 30. Against a pivotal movement directed to the rear, viewed in the direction of rotation, a stop 37 is provided, which is adapted to cooperate with the extension 36 on the sleeve 31. In this way in operation the arms 32 are prevented from swinging too far to the rear, when encountering heavy crop, which would be harmful to the raking effect. If desired, the stop 37 may be displaced in the longitudinal direction to put it out of the reach of the extension 36.

In operation the lower limb 48 of the support 45 for the tines 51, which limb is at least substantially parallel to a tine, moves along the ground, while the portion 38 of an arm 32 can turn about the longitudinal center line $c$ of the pin 41 crossing the rotary axis of the rake member at right angles with respect to the portion 33 of the arm 32 coupled with the central part so that a satisfactory matching of the ground is ensured. The part of the portion 38 holding the support 45 then extends at least substantially in a horizontal direction (see FIG. 4). When the support 45 for the tines 51 occupies the position shown in the Figures relatively to the arm 32, the active portions 52 of the tines 51 extend at least substantially in a radial direction and the implement can then be employed for tedding, the crop displaced by the tines being moved between the rake members to the rear and spread. If it is desired to form swaths with the aid of the guide members 82, the position of the tines 51 can be varied. The support 45 can be moved, subsequent to the setting of the pin 46, by turning about the longitudinal center line $d$ of the pin 44A, into a position in which the tines are in a slightly dragging position with respect to the direction of rotation B. In order to form a swath, the guide members 82 are as near as possible to one another. The position shown in FIG. 1 may be employed for spreading crop. The protective part 3 provides, in operation, a satisfactory protection against the high-speed rake members 12. By means of the ground wheel arranged beneath each rake member the rake members can satisfactorily match the conditions of the ground so that in conjunction with the individual adaptability of the tine supports 45 an ideal run of the implement is ensured. In order to prevent the support 45 of the tines and the portion 38 of the arm 32, to which the tine support is secured, from turning to an excessive extent, the stops 55 are provided for limiting the upward and downward turns of the portion 38. Moreover, the lower stop 55 prevents the portions 38 from tilting completely downwards, when the implement is changed over to the transport position.

For moving the implement into a transport position, it can be lifted by means of the three-point lifting device, the arms 32 for the tines being then capable of turning about the pins 30 into the position shown in the drawings. Then the tiltable end parts 65 of the protective part 3 can be tilted downwards and locked in this position by means of the locking mechanisms on the rear side comprising the spring-controlled pins 84. In this position the parts 65 prevent, in transport, the tined arms 32 from swinging outwardly. When the implement is discoupled, it can bear on the tilted-down portions of the protective part.

As stated above, a tine or a group of tines, in operation, is capable not only of turning about a shaft $a$, which is at least substantially parallel to the rotary axis $b$ of the rake member 12, but also of turning about an axis $c$, which crosses the rotary axis of the rake member at least in this embodiment substantially at right angles. By means of the pivotal joint of an arm 32 and the central part of the rake member comprising the axis $a$, a tine can be readily moved by centrifugal force into a working position. When after lifting the implement, the drive of the rake members is disengaged, the tines can turn under the action of their own weight about the axes $a$ into the transport position.

The implement of simple construction described above ensures a very effective operation, while the individual adaptability of the tines ensures clean work.

Figure 9:
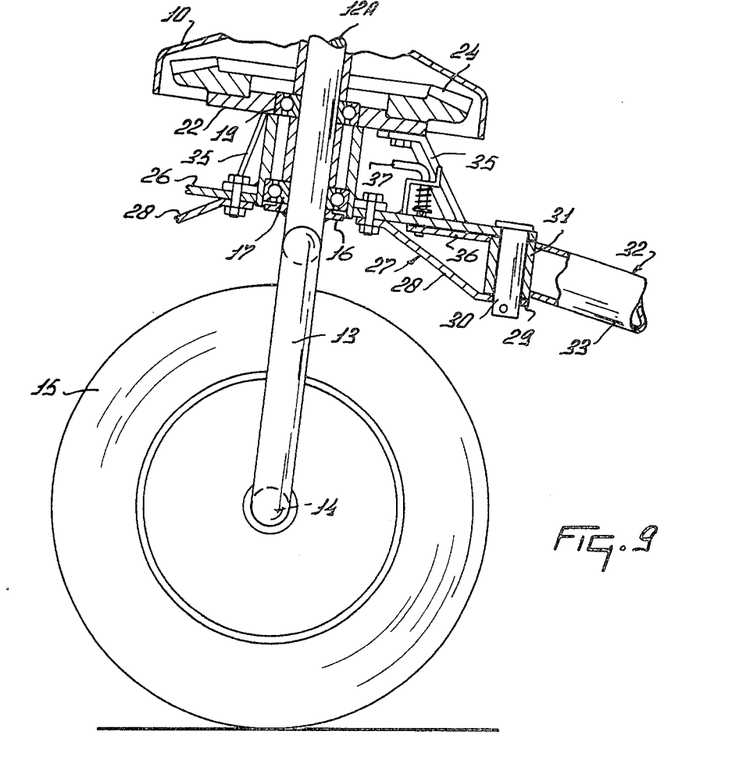
FIG. 9 illustrates a modified fastening arm of the rake member.

FIG. 9 shows an embodiment in which the supporting ring 26 is nearer the gear box 10. The shaft portion 12A may therefore be shorter and the bracket 13 may be larger so that a larger ground wheel 96A may be arranged beneath the rake member.

Figure 10:
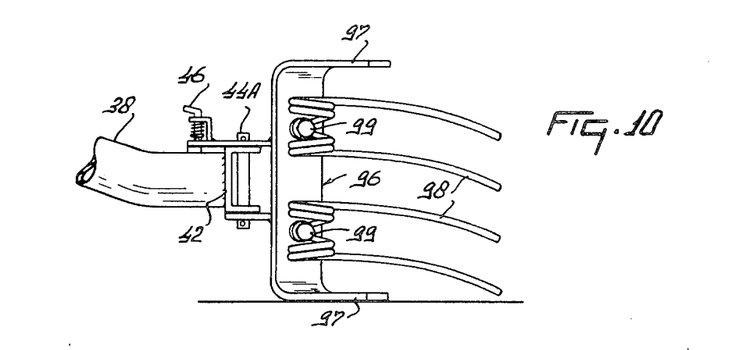
FIG. 10 shows a tine support having four tines.

FIG. 10 shows an embodiment in which the support for the tines is larger and two pairs of integral tines 98 are arranged by bolts 99 between the limbs 97.

Figure 11:
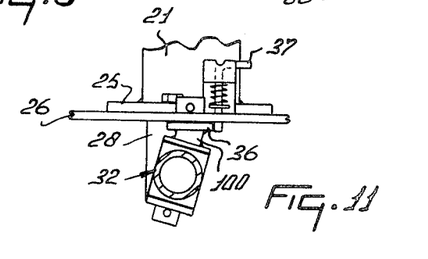
FIG. 11 illustrates a further modified fastening arm.
Figure 12:
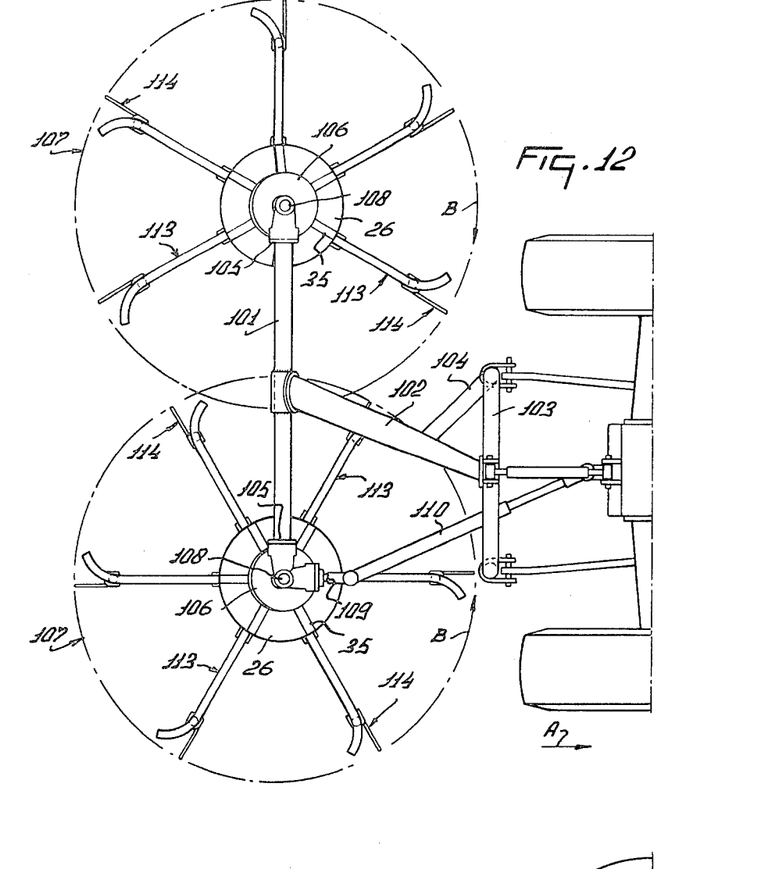
FIG. 12 is a plan view of another embodiment of the hay-making machine.

FIG. 11 shows an embodiment in whcih an arm 32 for the tines is coupled by means of a shaft 100 with the central part of the rake member, said shaft 100 crossing the rotary axis $b$ of a rake member 12, viewed in a radial direction. It can thus be ensured that in operation, an arm 32 readily deflects from an unevenness of the ground, when the stop 37 is removed.

Figure 13:
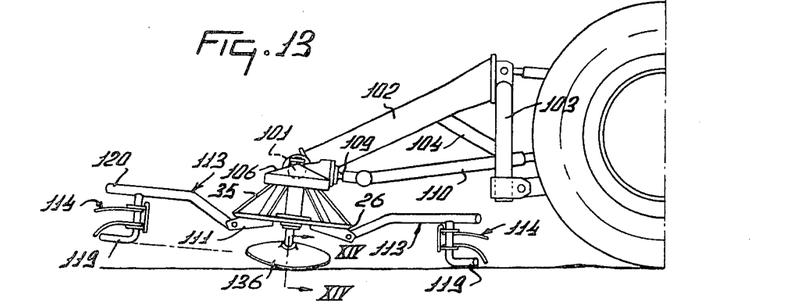
FIG. 13 is a side elevation of the machine shown in FIG. 12.
Figures 14, 15:
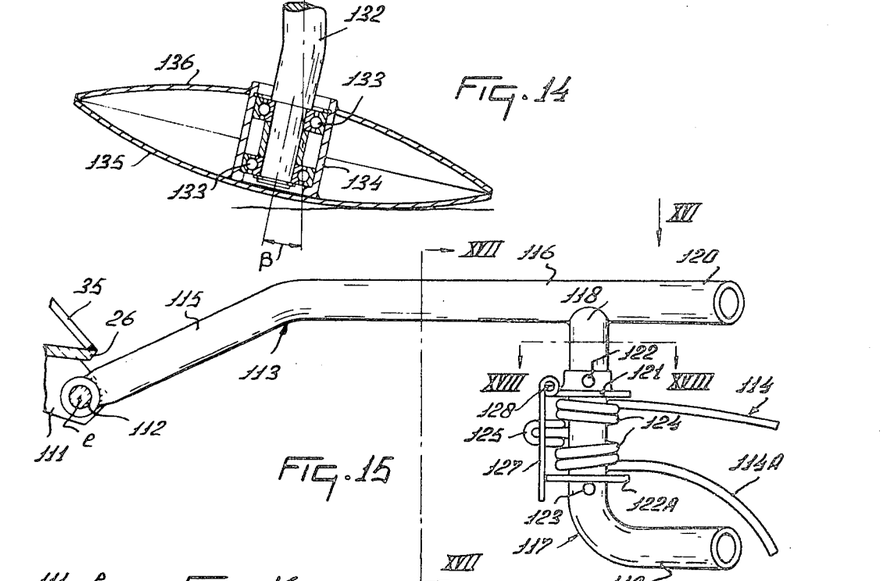
FIG. 14 is an enlarged elevation taken on the line XIV—XIV in FIG. 13.
FIG. 15 illustrates on an enlarged scale the connection of an arm with the central part of the rake member and the connection of a tine support.

The implement shown in FIGS. 12 to 19 comprises a tubular frame beam 101, extending transversely of the direction of movement A and connected near the center with an upwardly inclined frame beam 102, the front end of which is secured to a trestle 103 for the attachment to the three-point lift of a tractor. The front end of the beam 102, which is inclined to the right, viewed on plan and with respect to the direction of movement, away from its fastening area on the frame beam 101, is secured to the top side of the three-point lift. Between the trestle 103 and the frame beam 102 a strut 104 is provided. The ends of the frame beam 101 are provided by means of vertical plates 105 with gear boxes 106. The beam 101 and the gear boxes accommodate, like in the preceding embodiment, a drive for rake members 107, which are adapted to rotate about the shafts 108 arranged in the gear boxes 106. The shafts 108 are fastened in the gear boxes in the same manner as the shafts 11 and the rake members 107 are adapted to rotate about the shafts 108 by means of a similar central part. The longitudinal axes of the shafts 108 constitute the rotary axis of the rake member. The right-hand gear box 106, viewed in the direction of movement, comprises in this embodiment a bearing for a shaft 109, extending in the direction of movement A and adapted to cooperate by means of a bevel gear wheel (not shown) with a toothed rim 24 of the drive of a rake member 107, said shaft being adapted to be coupled by means of an auxiliary shaft 110 with the power take-off shaft of the tractor. In this embodiment, the bottom side of the supporting ring 26 associated with the central part of the rake member is provided at equal intervals with pairs of tags 111 (FIG. 15). Between the tags 111 an arm 113 for tines 114 and 114A is arranged by means of a shaft 112, the longitudinal center line $e$ of which crosses the rotary axis of the rake member at right angles and extends in a tangential direction. Each arm 113 comprises two portions 115 and 116, which are at an angle to each other. The shorter portion 115 is located on the side of the pivotal joint with the central part, whereas the longer portion 116 is provided at a given distance from the free end with a support 117 for the tines 114 and 115A. The support 117 is arranged on the lower side of the portion 116 and comprises a straight portion 118, extending downwards away from its fastening point and terminating in a bent-over portion 119, which is parallel to the portion 116 of the arm 113 and has a length corresponding with the length of the portion 120 of the portion 116 located between the free end and the fastening point of the support (FIG. 15).

Figure 16:
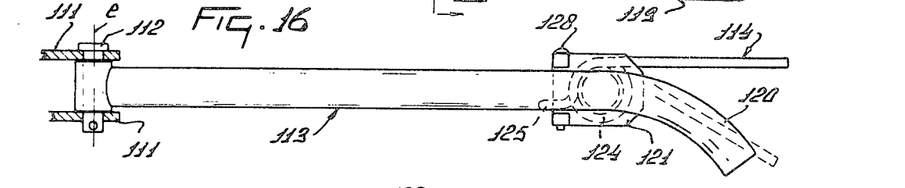
FIG. 16 is an elevation in the direction of the arrow XVI in FIG. 15.

From FIG. 16 it will be apparent that the two portions 119 and 120 are bent over so that with respect to the direction of rotation B of the rake member they extend to the rear. The portion 118 of the support 117 is provided with a flange 121, which is secured in place by means of a pin 122 with respect to the support. Beneath the flange 121 and at a distance therefrom a supporting ring 122A is provided and held in place by means of a safety pin 113. Between the flange 121 and the supporting ring 122A are enclosed coils 124 surrounding the portion 118 and being associated with two integral tines 114 and 114A, while a connecting part 125 located between the coils 124 projects to one side. The part 125 is located in an opening 126 in a locking plate 127, which is adapted to pivot about a shaft 128 with respect to the flange 121. The longitudinal center line of the pin 128 crosses the longitudinal center line of the portion 118 substantially at right angles. The flange 121 is provided with two sleeve-like supports 129 arranged at a distance from each other and having a spring 130 arranged between them which surrounds the shaft 128 passed through the supports 129. The spring 130 bears at one end on the locking plate 127 and by the other end on the flange 121 so that the locking plate 127 is held in the position shown in FIGS. 15 to 17. By means of the locking plate 127, which has a second opening 131 (see FIG. 17) the position of the tines 114 can be changed by turning the tines about an axis which coincides with the longitudinal center line of the straight portion 118 of the support 117.

Figures 17, 18:
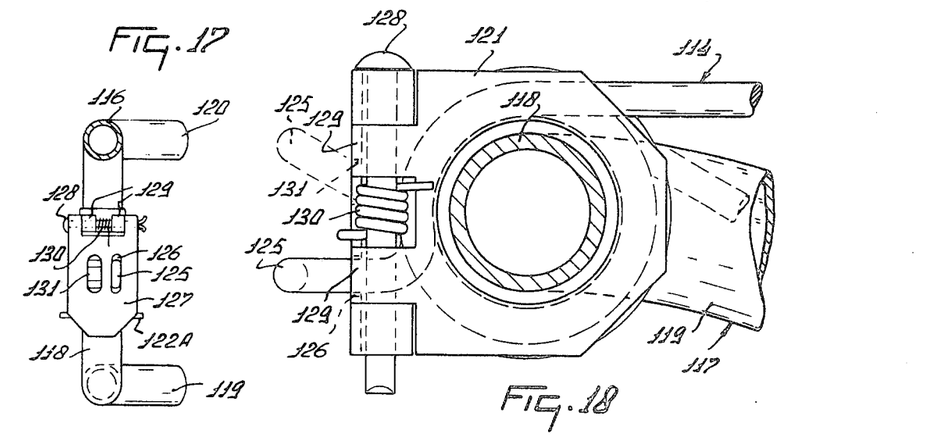
FIG. 17 is an elevation taken on the line XVII—XVII in FIG. 15.
FIG. 18 is an enlarged elevation taken on the line XVIII—XVIII in FIG. 15.
Figure 19:
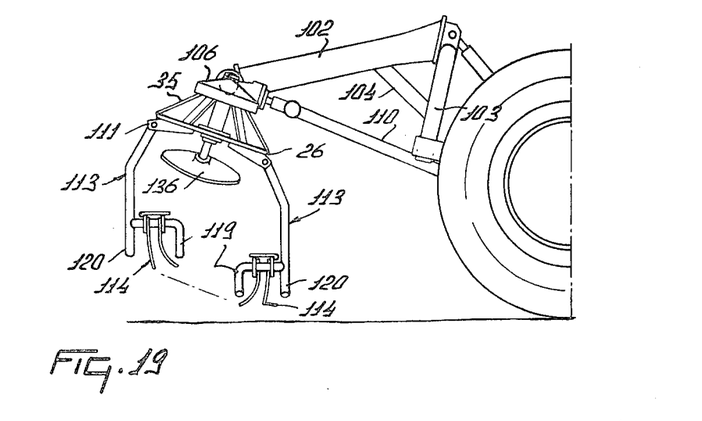
FIG. 19 is a side elevation of the machine shown in FIG. 12 in the transport position.

It will be seen from FIG. 17 that the opening 131 is wider than the opening 126 because the projecting part 125, when inserted, occupies a slightly inclined position in said opening. The tines 114 and 114A comprise, viewed on plan (FIG. 16) a straight, active portion, which is bent down along a given curve, viewed from aside. The curve of the lower tine 114A is sharper than that of the upper tine 114 (FIG. 5). Near the lower side a shaft 108 of a rake member 107 is kinked over a portion 132 so that an angle $b$ of at least 15° is formed between the longitudinal center lines of the kinked portion and the further portion of said shaft. A housing 134 is arranged by means of bearings 133 around the kinked portion 132, said housing being secured on the bottom side to the inner side of a dish 135. The top side of the dish 135 is covered by a part 136, which is the mirror image of the dish 135 and joins the top side of the housing 134.

In operation, the rake members can be driven by means of the drive described above via the auxiliary shaft 110 by the power take-off shaft of the tractor in the direction of the arrows B and under the action of centrifugal force the arms 113 turn about the shafts 112 and move the tines 114 in the working position shown in FIG. 13. Then each rake member 107 bears on the ground by means of its supporting member formed by the rotatable dish 135 and the arms 113 for the tines 114 are in a position such that the portions 116, to which the supports 117 for the tines 114 are secured, extend at least substantially in a horizontal direction. In operation, the bent-over portions of the supports 117 slide along the ground over part of a revolution of a rake member and ensure an effective matching of the ground for the tines 114 by turning about the axis $a$, which crosses the rotary axis of the rake member 107 at right angles. The lower tine having the more strongly curved active portion picks up the crop quite satisfactorily, particularly if the crop tends to stick.

Like in the preceding embodiment, the position of the tines 114 can be adapted to the work to be effected. In the position of the tines shown in FIGS. 12 and 16, for example, the implement can be employed for tedding the crop, the crop being thrown to the rear past between the rake members, where it is spread. When the tines are set in the position shown in broken lines by means of the locking plate 127, the projecting part between the coils being then located in the opening 131 of the locking plate 127, the tines are in dragging positions and suitable for the formation of a swath. For transporting the implement, it can be lifted by means of the three-point lift of the tractor and when the rotation of the rake members stops, the arms will turn about the shafts 108 into the position shown in FIG. 19. Thus, the tines 114 are located on the inner side of the arms 113 and since the arms are kinked in the manner described above, the parts 116 to which the supports 117 for the tines are secured, extend at least substantially in a vertical direction. In this way an ideal transportability is obtained. In order to put the implement again into operation, the rake members 107 being in the lifted position can be caused to rotate until the arms 113 holding the tines turn about the shafts 108 into a radial or substantially radial direction. Subsequently the implement can be lowered into the working position shown in FIG. 13.

Figure 20:
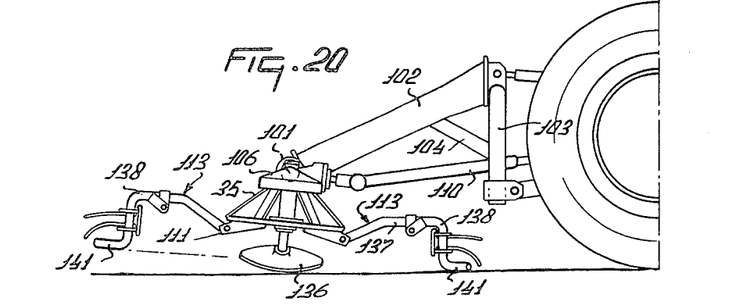
FIG. 20 is a side elevation of a working position of the machine shown in FIG. 12, in which the tine supports are pivotable relative to the arms.
Figures 21, 22:
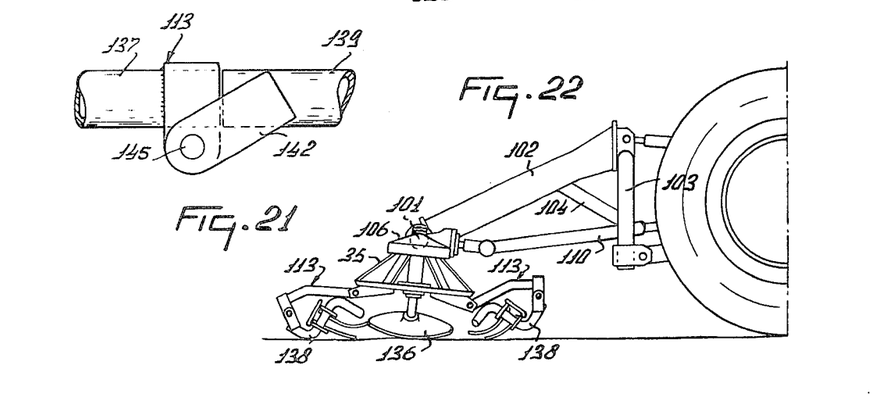
FIG. 21 illustrates on an enlarged scale the pivotal connection of a tine support.
FIG. 22 is a side elevation of the device shown in FIG. 20, the device now bearing on the tine support.

In the embodiment shown in FIGS. 20 to 22 the tined portion 137 of an arm 113 is shorter and by means of a pin 145 crossing the rotary axis of a rake member 107 and extending parallel to a shaft 112 pivoting an arm 113 to the central part, a tine support 138 is secured to the arms 113. In this embodiment a support 138 comprises an upper portion 139, which is bent over at right angles with respect to the dragging portion 141 provided with the tines and extends at least substantially parallel to and opposite the dragging portion 141, which slides along the ground in operation. The portion 137 of an arm 113 is arranged by means of a pin 141 between two tags 142 secured to the portion 139. The tags 142 inclinded downwardly away from their fastening points and are proportioned so that the portion 139 of the support 138, when being in line with the portion 137, bears on the end of the latter portion. In this way a stop is formed to prevent, in operation, an excessive upward turn of a tine support 138 with respect to an arm 113. When the implement is moved into the transport position, the arms on the tine supports 138 turn in the manner illustrated in FIG. 22 so that, when the implement is lowered, it arrives at a position in which it can bear on the supports 138 without a risk of damage of the tines. This facilitates storing of the implement in a position from which it can be readily attached again to a tractor. Also this embodiment provides the possibility for the tines by turning about an axis crossing the rotary axis of the rake member under the action of centrifugal force during the rotation of the rake members to readily attain the working position, whereas when the implement is changed over to the transport position and the rotation of the rake members is stopped, the tines turn about said axes by their own weight so that the implement can be readily transported. In the transport position the arms 113 provide a protection against contact with the tines.

The invention is not restricted to the foregoing statements, but also relates to all details of the Figures, whether described or not described.

What is claimed is:

1. A hay making machine attachment comprising frame means and at least one rake member with a central portion rotatably mounted on an upwardly extending shaft supported on said frame means, said rake member having arms pivotably associated with said central portion and said arms being pivotable about corresponding axes, tines being pivoted to said arms, said arms being freely movable by centrifugal force about said axes outwardly from said shaft and said tines being moved to substantially radial positions during the operative rotation of said rake member, said tines being arranged in groups and each group being mounted on a tine support connected to a corresponding one of said arms, said support having the general shape of a U-shaped bracket with limbs being located one above the other and said bracket with tines being movable upwardly from a lower position to its substantially radial position.

2. An attachment as claimed in claim 1, wherein a group of tines is located between said limbs.

3. An attachment as claimed in claim 1, wherein each group of tines extends outwardly from said shaft and is adjustably connected to its corresponding arm.

4. An attachment as claimed in claim 1, wherein each group of tines is pivotable about an axis which coincides with the longitudinal center line of a part of said support, said group being connected to said part.

5. An attachment as claimed in claim 4, wherein a locking member is mounted on said support for fixing a tine in a plurality of positions with respect to that support.

6. An attachment as claimed in claim 5, wherein said locking member is associated with a spring member and pivotable against the bias of said spring.

7. An implement as claimed in claim 6, wherein said locking member is pivotable about an axis that extends non-parallel to the first mentioned axis about which said group of tines is pivotable.

8. An implement as claimed in claim 6, wherein said locking member is a plate.

9. An attachment as claimed in claim 8, wherein said plate has at least one opening and a portion of at least one of said tines is fitted in said opening, said portion being an extension of a tine group.

10. An attachment as claimed in claim 9, wherein said plate has two openings and said extension can be alternatively fitted in either opening.

11. An attachment as claimed in claim 10, wherein said one opening is smaller than the other opening.

12. An attachment as claimed in claim 11, wherein said one opening is elongated and extends in upward direction.

13. An attachment is claimed in claim 9, wherein said extension is integral with said group of tines.

14. An attachment as claimed in claim 13, wherein said extension is formed by a tine portion located between two tines of said group.

15. An attachment as claimed in claim 9, wherein said group is movable into either of two positions.

16. A hay making machine attachment comprising frame means and at least one rake member rotatably mounted on an upwardly extending shaft supported on said frame means, a central hub of said member mounted on said shaft and arms connected to said hub, tines mounted on the outer portions of said arms and said tines each being freely pivotable relative to said hub through at least two spaced-apart pivot pin connections that interconnect the corresponding outer arm portion to said hub, said arms and tines being movable from lower positions to outwardly directed operative working positions by centrifugal force during the rotation of said rake member.

17. An attachment as claimed in claim 16, wherein one of said two pivot connections is located further in a radial direction from said hub than is the other and said one connection turns on an upwardly extending pivot axis.

18. An attachment as claimed in claim 17, wherein said one connection comprises a pivot pin having a longitudinal axis that extends substantially parallel to said shaft.

19. An attachment as claimed in claim 16, wherein said tines are pivotable to folded transport positions by their respective weights during non use.

20. An attachment as claimed in claim 16, wherein a first of said two pivot connections is located further in a radial direction from a corresponding tine towards said hub than a second connection and said first connection turns on an axis that is non parallel to said shaft.

21. An attachment as claimed in claim 20, wherein said first connection turns on an axis that extends substantially perpendicular to said shaft.

22. An attachment as claimed in claim 20, wherein each of said connections turn on an axis that extends non parallel to said shaft.

23. An attachment as claimed in claim 16, wherein each of said arms is pivoted to said hub and at least a portion of each arm is freely pivotable about one of said connections between stop means.

24. A hay making machine attachment comprising frame means and at least one rake member rotatably mounted on an upwardly extending shaft supported on said frame means, said member including a central hub on said shaft and arms pivoted to said hub, tines mounted on outer portions of said arms and said tines each being freely pivotable relative to said hub through at least two radially spaced-apart pivot pin connections on the corresponding arm that interconnects the tine to the hub, said connections comprising pins extending substantially parallel to one another and non-parallel to said shaft, said arms and tines being movable from lower positions to outwardly directed operative working positions by centrifugal force during the operative rotation of said rake member.

25. An attachment as claimed in claim 24, wherein said rake wheel is supported on an inclined dish member that is rotatably mounted on angled shaft means to contact the ground a substantial distance from said shaft means.

26. An attachment as claimed in claim 24, wherein said pins extend substantially tangential relative to a circle centered on said shaft when the rake member is viewed in a direction parallel to that shaft.

27. An attachment as claimed in claim 24, wherein said two connections are between the tines and their corresponding arms.

28. An attachment as claimed in claim 27, wherein each tine is freely pivotable about a pivot pin and said pin is located adjacent said tine.

29. An attachment as claimed in claim 24, wherein each arm is connected to said hub by one of said two pins and freely pivotable about that pin.

30. An attachment as claimed in claim 24, wherein each arm comprises stop means and each tine is freely pivotable on a first of said pins through a range limited by stops of said stop means.

31. An attachment as claimed in claim 24, wherein each tine is mounted on a support which is adjustably connected to a corresponding arm, said tine being movable through means independently of said two pivot pins to at least two different working positions.

32. An attachment as claimed in claim 31, wherein the tine is interconnected with said arm by a further pin and movable to working positions on said further pin.

33. An attachment as claimed in claim 32, wherein a spring-biased locking member on said support is located to retain said tine in said working positions.

34. An attachment as claimed in claim 33, wherein the tines are mounted in groups and said locking member is turnable about said further pin about an axis that extends non parallel to said two pins.

35. An attachment as claimed in claim 34, wherein said non parallel axis extends at right angles to the axes defined by said two pins.

36. A hay making machine attachment comprising frame means and at least one rake member with a central portion rotatably mounted on an upwardly extending shaft supported on said frame means, said rake member including arms pivoted to said central portion and said frame means comprising a framework of interconnected beams that extend generally horizontal, said framework having coupling means connectable to a tractor lifting device at its foremost side and tiltable side end parts, said parts being pivotable from a substantially horizontal and protective position to a generally vertical transport or support position in which the rake member is supported by said beams and the arms are pivoted to transport positions between said end parts, said end parts being pivotable about an axis extending generally in the direction of travel of the implement and flexible with respect to the remainder of said frame means in at least two different positions.

37. An attachment as claimed in claim 36, wherein said arms are pivotable to a transport position in which the arms extend generally parallel to the direction of travel and said end parts, in their vertical positions, afford stops for said arms.

* * * * *